United States Patent

Seki

[15] 3,673,396
[45] June 27, 1972

[54] NUMERICALLY CONTROLLED CONTOURING SYSTEM

[72] Inventor: Susumu Seki, Kokubunji-shi, Japan
[73] Assignee: Hitachi, Ltd., Tokyo, Japan
[22] Filed: Dec. 30, 1968
[21] Appl. No.: 787,951

Related U.S. Application Data

[63] Continuation-in-part of Ser. No. 440,187, March 16, 1965, abandoned.

[30] Foreign Application Priority Data

March 16, 1964 Japan...................................39/14378

[52] U.S. Cl............................................235/151.11, 318/18
[51] Int. Cl................................................G05b 19/24
[58] Field of Search...........235/151.11; 318/20.108, 20.110, 318/20.120, 20.130

[56] References Cited

UNITED STATES PATENTS

| 3,128,374 | 4/1964 | Yu chi Ho et al................. | 135/151.11 |
| 3,270,186 | 8/1966 | Centner............................ | 235/151.11 |
| 3,325,630 | 6/1967 | Murakami......................... | 235/61.6 |
| 3,176,120 | 3/1965 | Whitemore et al............... | 235/151.11 |

OTHER PUBLICATIONS

Kaiwa and Inaba: " Simple Arithmetic Computes Cutter Offsets," Control Engineering, March 1962, pp. 93–96

Primary Examiner—Eugene G. Botz
Attorney—Craig, Antonelli, Stewart & Hill

[57] ABSTRACT

Numerically controlled contouring system wherein original command pulses ($\Delta X$, $\Delta Y$) and offset pulses ($\Delta x$, $\Delta y$) are synthesized so as to obtain offset command pulses ($\Delta X + \Delta x$, $\Delta Y + \Delta y$) for following the offset curve at a desired offset distance away from an original curve $\{X(\tau), Y(\tau)\}$ and an operation for producing said offset command pulses is controlled so that the inner product of the tangential direction ($dX/d\tau$, $dY/d\tau$) of the original curve and a variable ($x, y$) varying along the circumference of a circle having a radius equal to the offset distance and a center lying on the original curve, is made zero.

1 Claim, 15 Drawing Figures

INVENTOR
SUSUMU SEKI
BY Craig & Antonelli
ATTORNEYS

NUMERICALLY CONTROLLED CONTOURING SYSTEM

CROSS-REFERENCE TO RELATED APPLICATION

The present application is a continuation in part application of an earlier application Ser. No. 440,187 filed Mar. 16, 1965, now abandoned.

BACKGROUND OF THE INVENTION

1. Field of the Invention

The present invention relates to numerically controlled contouring systems and more particularly to novel numerically controlled contouring systems having a so-called offset function wherein it is unnecessary to reform predetermined information for following an original curve so as to follow an offset curve at a desired offset distance away from the original curve, even if the offset distance is changed.

2. Description of the Prior Art

As is well known, according to a conventional numerically controlled contouring system, it is necessary to reform predetermined information for following an original curve so as to follow an offset curve at a desired offset distance away from the original curve whenever the offset distance is changed. For example, when a work piece is processed by a conventional numerically controlled contouring machine tool, information on the locus of a cutter center along which the cutter is moved has previously been calculated by a digital computer or the like and recorded on an instruction tape or the like. At the time of processing, the information is read out from the tape and the cutter is made to move along said locus by an instruction based on the information. However, when the cutter is changed to a different one having a different radius, the information must be made anew. Because, the new locus along which this changed cutter is moved being naturally different from the locus along which the previous cutter moves, and said information relating to a locus of a cutter having a certain radius, the changed cutter cannot be moved along a new locus unless new information adapted to the changed cutter is formed by recalculation. Consequently, in the case of such a conventional machine tool, when the cutter is to be changed, an instruction tape must be reformed in accordance with the radius of the changed cutter.

As described above, the conventional machine tool does not have the function of producing an instruction about the new locus by automatically correcting the locus of the cutter center when the radius of the cutter is changed, that is, an offset function. Thus, the conventional machine tool has the defect that an instruction tape must be reformed each time the radius of a cutter is changed.

SUMMARY OF THE INVENTION

An object of the present invention is to provide a numerically controlled contouring system having the above-mentioned offset function.

Another object of the present invention is to provide a numerically controlled contouring machine tool which need not reform an instruction tape by calculating the information about the new locus of the changed cutter even when the radius of the cutter is changed.

Another object of the present invention is to realize said offset function with a simple and consistent construction.

A further object of the present invention is to settle the problem of information processing at a point of discontinuity on said locus.

A still further object of the present invention is to provide a numerically controlled contouring system having the offset function which can be applied not only to machine tools but also to other devices for following a curve and the like.

The system according to the present invention is characterized in that in order to realize the above objects it comprises at least first means for producing original command pulses ($\Delta X$, $\Delta Y$) to follow an original curve $\{X(\tau), Y(\tau)\}$ and tangential signals indicating the tangential direction ($dX/d\tau$, $dT/dt$) of the original curve, second means for producing variable signals which indicate variables ($x$, $y$) varying along the circumference of a circle having the radius equal to a desired offset distance and a center lying on the original curve and offset pulses ($\Delta x$, $\Delta y$) for following the variables, third means for producing an inner product signal indicating the inner product $S = x(dX)/(d\tau) + y (dY)/d\tau)$ of the tangential direction and the variable from the tangential signal and the variable signal, control means for controlling the direction of variation of the variable in accordance with the inner product signal so as to make said inner product zero, and fourth means for synthesizing said original command pulses and said offset pulses so as to obtain offset command pulses ($\Delta X + \Delta x$, $\Delta Y + \Delta y$) for following the offset curve at said offset distance away from the original curve.

DESCRIPTION OF THE PREFERRED EMBODIMENT

First of all the principle according to the invention will be presented. As described before, the locus of the cutter center of a numerically controlled contouring machine tool lies at the same distance as the radius of the cutter away from the contour of a work piece. The curve at a definite distance corresponding to the radius of the cutter from the original curve (for example, the contour of a workpiece) is called an offset curve, and the relation between the two curves is called offset.

Figures 1, 3:
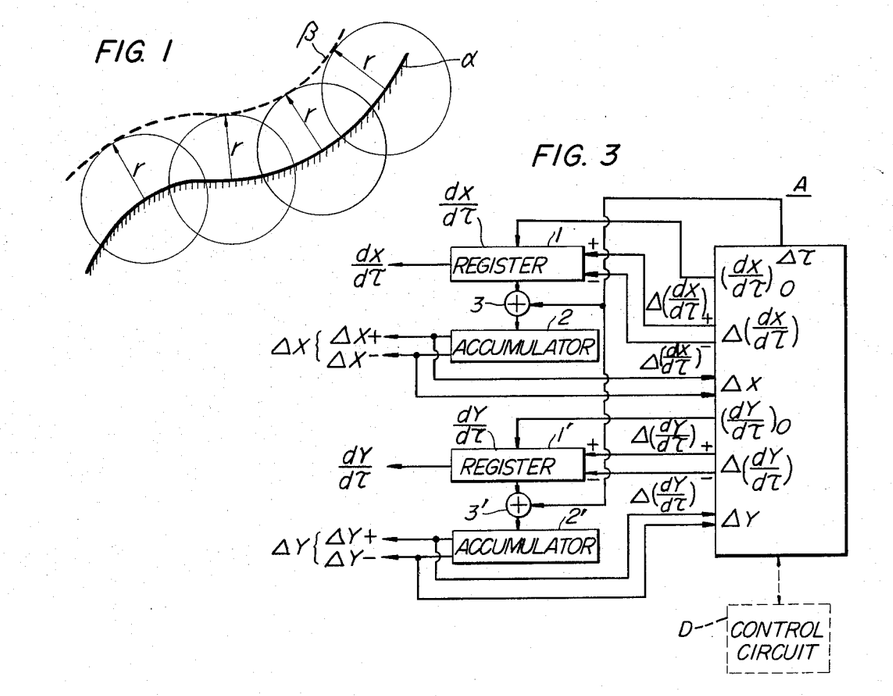
FIG. 1 is a diagram showing an envelope of a group of circles each having the center lying on the original curve.
FIGS. 3 and 7 to 10 are block diagrams of parts constituting the embodiment of the invention.

For example, if a workpiece having a curved profile, e.g. an original curve $\alpha$ in FIG. 1 is worked by the numerically controlled contouring machine tool, its cutter center should be instructed to follow a locus $\beta$ (offset curve) offset therefrom by the radius $r$ of the cutter.

Assuming that the original curve $\alpha$ is represented in the Cartesian coordinate system X – Y with the aid of a parameter $\tau$, it can be represented generally by equations $$X = X(\tau), Y = Y(\tau) \qquad 1.$$

Now, the original curve $\alpha$ is expressed by $$X'(\tau') = X(\tau') - X(\tau), Y'(\tau') = Y(\tau') - Y(\tau) \qquad 2.$$

with the aid of a new parameter $\tau'$ in a new Cartesian coordinate system X' – Y' the origin of which is moving along the original curve $\alpha$ with the variation of the parameter $\tau$. This original curve $\alpha$ passes the origin of the system X' – Y' when $\tau' = \tau$. Then the tangential direction $$\left(\frac{\gamma X'}{\tau'}, \frac{\gamma Y'}{\tau'}\right)_{\tau'=\tau}$$

at the origin is $$\left(\frac{\gamma X'}{\gamma \tau'}, \frac{\gamma Y'}{\gamma \tau'}\right)_{\tau'=\tau} = \frac{dX(\tau')}{d\tau'}, \frac{dY(\tau')}{d\tau'} \bigg|_{\tau'=\tau} = \left(\frac{dX}{d\tau'}, \frac{dY}{d\tau}\right) \qquad (3)$$

Consequently, there is the following relation between the original curve $\{X(\tau), Y(\tau)\}$ and the offset curve which is offset by the radius $r$ from the original curve.

Figure 2A:
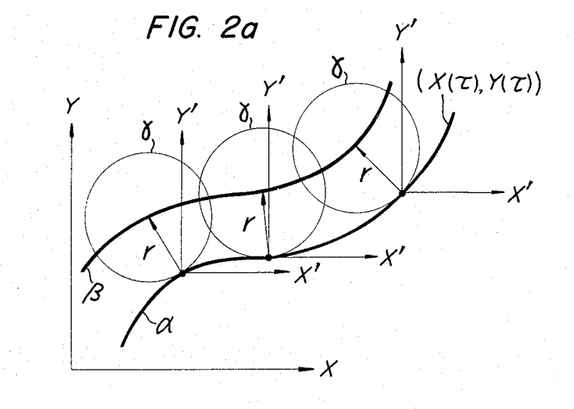
FIGS. 2a and 2b are diagrams illustrating the principle of the operation of a numerically controlled contouring system according to the invention.

That is, assuming that the coordinate of each point on the offset curve $\beta$ at a distance $r$ from each point on the original curve $\alpha$ is ($x$, $y$) with reference to the coordinate system X' – Y', the coordinate ($x$, $y$) must satisfy $x^2 + y^2 = r^2$ and at the same time the circumference of the circle $\gamma$ centered at ($x$, $y$) and having a radius $r$ passing through the origin of the system X' – Y' and the direction of the tangent to the circle $\gamma$ at the origin coincides with the direction ($dX/d\tau$, $dY/d\tau$) as seen from FIG. 2a. This can easily be understood by taking the circle $\gamma$ to be the circumference of the cutter and the coordinate $(x, y)$ to be the cutter center. That the tangential direction of the circle $\gamma$ coincides with the direction ($dX/d\tau$, $dY/d\tau$) means that the position vector of the point $(x, y)$ and the tangential vector are orthogonal, that is, the inner product $S = (x)(dX)/(d) + (y)(dY)/d\tau$ of both vectors is zero.

Thus, the coordinate $(x, y)$ of an arbitrary point on the offset curve $\beta$ (i.e. a locus of the cutter center) in the coordinate system $X' - Y'$ must satisfy the relations $$x^2 + y^2 = r^2 \qquad 4.$$
$$(x)(dX)/(d\tau) + (y)(dY)/(d\tau) = 0 \qquad 5.$$

Figure 2B:
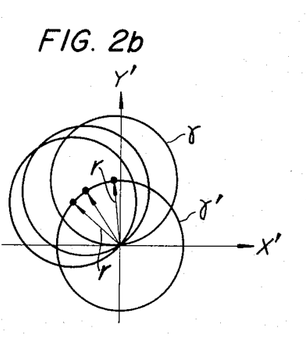

The above relations can be illustrated as in FIG. 2b. That is, the center $(x, y)$ of a circle $\gamma$ lies on the circumference of the circle $\gamma'$ centered at the origin of the system $X' - Y'$ and the center of the circle $\gamma$ moves on the circumference of the circle $\gamma'$ while satisfying Equations (4) and (5) with the variation of the parameter $\tau$. As described above, since the origin of the system $X' - Y'$ moves on the original curve $X - Y$, the offset curve $\beta$ may be said to form an envelop of a family of circles $\gamma'$.

It is apparent from the above description that an offset-free instruction for following the original curve $\{X(\tau), Y(\tau)\}$ is equivalent to an instruction for commanding a parallel displacement of the system $X' - Y'$ and the cutter center is regarded as being fixed at the origin of the system $X' - Y'$. Accordingly, in case the offset is desired, it is necessary to synthesize the offset-free instruction and the instruction for following the coordinate (variable) $(x, y)$ lying on the offset curve in the system $X' - Y'$. That is, it will be sufficient to control in the numerically controlled contouring system in the following way: For example, in the system $X' - Y'$, the cutter is moved from the origin to the point $(x, y)$ spaced apart therefrom by $r$ at the beginning of the interval during which the offset is necessary. Then the cutter is moved along the offset curve in accordance with $(x, y)$ and $(X, Y)$ which is controlled to satisfy Equations (4) and (5) during said interval, and is made to return to the origin at the end of said interval.

The numerically controlled contouring system according to the present invention is constructed to practise the above principle. The construction and operation of an embodiment of the system will be described with reference to FIGS. 4 to 10.

Figure 4:
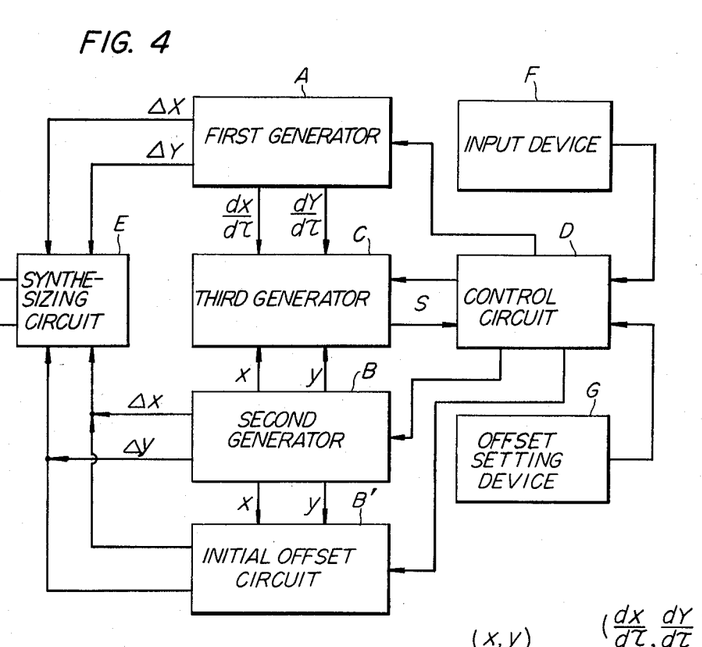
FIG. 4 is a block diagram of an embodiment of the invention.

Referring to FIG. 4, reference character A designates a first generator for producing original command pulses ($\Delta X$, $\Delta Y$) to follow an original curve and tangential signals indicating the tangential direction ($dX/d\tau$, $dY/d\tau$) of the original curve, an example of the construction of which is shown in FIG. 3. Referring to FIG. 3, such informations concerning the tangential direction of the original curve as $$\Delta\left(\frac{dX}{d\tau}\right), \Delta\left(\frac{dY}{d\tau}\right), \left(\frac{dX}{d\tau}\right)_o \text{ or } \left(\frac{dY}{d\tau}\right)_o$$

and an information $\Delta\tau$ concerning the parameter $\tau$ are sent from an input device F (described later) through a control circuit D to the generator shown in FIG. 3. $\Delta(dX/d\tau)$ and $\Delta(dY/d\tau)$ indicate increments of $(dX/d\tau)$ and $(dY/d\tau)$, respectively, and they can be given when a curve the tangential direction of which varies continuously is followed. After $(dX/d\tau)o$ and $(dY/d\tau)o$ have been read out and set in registers 1 and 1', pulses corresponding to these $\Delta(dX/d\tau)$ and $\Delta(dY/d\tau)$ are added to or subtracted from the registers 1 and 1', and, at the same time, pulses $\Delta\tau$ are supplied to gates 3 and 3'. Each time pulses $\Delta\tau$ open and close gates 3 and 3', $(dX)/(d\tau)$ and $(dY)/(d\tau)$ set in these registers are accumulated in accumulators 2 and 2' and sent to a circuit C (described later) from the registers 1 and 1'. Carry pulses derived from the most significant digits of the accumulators 2 and 2' become positive going original command pulses $\Delta X$ and $\Delta Y$ and borrow pulses derived from the most significant digits become negative going original command pulses $-\Delta X$ and $-\Delta Y$. When the tangential directional of the original curve varies discontinuously, fresh values $$\left(\frac{dX}{d\tau}\right)_o \text{ and } \left(\frac{dY}{d\tau}\right)_o$$

are set in the registers 1 and 1' at the point of discontinuity.

Figure 7:
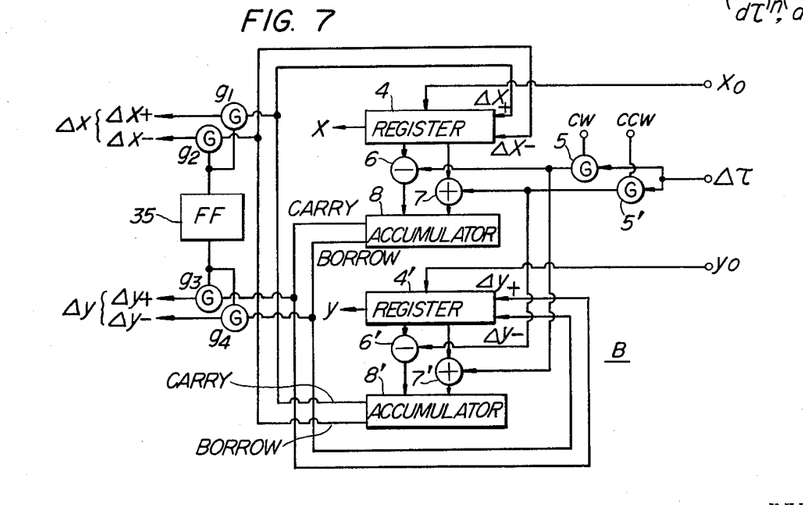

B is a second generator for producing variable signals which indicate variables $(x, y)$ varying along the circumference of a circle having a radius $r$ equal to a desired offset distance and a center lying on the original curve, and offset pulses ($\Delta x$, $\Delta y$) in accordance with the variation of said variables, an example of the construction of which is shown in FIG. 7. In FIG. 7, 4 and 4' are registers for storing the variable $(x, y)$, and the $x$ and $y$ stored in these registers vary clockwise or counterclockwise along the circle ($x^2 + y^2 = r^2$) in accordance with the instruction signal from the control circuit D.

Now, after initial values ($x_o$, $y_o$) have been set in the registers 4 and 4', respectively, when an instruction signal from the control circuit D is applied to a terminal CW of a gate 5 to open it, a pulse $\Delta\tau$ passes therethrough to open a $\ominus$ gate 6 and a $\oplus$ gate 7'. The variable $x$ passing through the $\ominus$ gate 6 is subtracted from an accumulator 8 and the variable $y$ passing through the $\oplus$ gate 7' is added to an accumulator 8'. This operation is repeated the number of times the pulse $\Delta\tau$ reaches the gate 5 during the time the instruction signal is being applied to the terminal CW, and as a result of the accumulation in the accumulators carry or borrow pulses are produced from the most significant digits of the accumulators. A carry pulse from the accumulator 8 is applied to the terminal $\Delta y+$ of the register 4' to add 1 to the content thereof and a borrow pulse from the accumulator 8 is applied to the terminal $\Delta y-$ of the register 4' to subtract 1 from the content thereof. In the same manner, 1 is added to the content of the register 4 in response to a carry pulse from the accumulator 8' and 1 is subtracted from the content of the register 4 in response to a borrow pulse from the accumulator 8'. In the above case, the density $(dx, dy)$ of carry or borrow pulses from each accumulator is proportional to the variable $x$, $y$ and the number $d\tau$ of addition and subtraction thereof. Therefore, the following relation can be obtained.

$$\frac{dx}{d\tau}\alpha + y \qquad \frac{dy}{d\tau}\alpha - x \qquad (7)$$

If the initial value of $(x, y)$ is $(x_o, y_o)$, $(x, y)$ varies clockwise along a circle expressed by $x^2 + y^2 = x_o^2 + y_o^2$.

Similarly, if the instruction signal from the control circuit D is applied to a terminal CCW, the following relation can be obtained.

$$\frac{dx}{d\tau}\alpha - y \qquad \frac{dy}{d\tau}\alpha + x \qquad (8)$$

Therefore in this case, $(x, y)$ varies counterclockwise along said circle.

Consequently, when the desired offset distance from the original curve is $r$, by setting the initial value of said registers satisfying $x_o^2 + y_o^2 = r^2$ at $(x_o, y_o)$, $(x, y)$ can be varied clockwise or counterclockwise in accordance with the instruction signal from the control circuit D. Said carry or borrow pulses are delivered as positive or negative offset pulses through gates $g_1$ to $g_4$ to a synthesizing circuit E (described latter), and at the same time the variable signals $(x, y)$ are sent to the third generator C and an initial offset circuit B' from the registers 4 and 4'. The gates $g_1$ to $g_4$ are opened or closed by means of a flip-flop circuit 35 to control the delivery of the offset pulses to the synthesizing circuit E. Since the flip-flop circuit 35 is set to "1" or "0" in accordance with a signal from the control circuit D, offset pulses ($\Delta x$, $\Delta y$) are applied to the synthesizing circuit E when the flip-flop circuit 35 is set to "1," whereas they are not applied thereto when the flip-flop circuit 35 is set to "0."

Incidentally, the flip-flop circuit 35 is set at "1" when a continuous curve is followed, but it is set at "0" at discontinuity points as will be described later and sometimes prevents the circuit of FIG. 7 from delivering offset pulses.

An initial offset circuit B' produces a signal for making, for example, the cutter move from a point on an original curve (the origin of the system X' − Y') to an initial point on an offset curve in advance of following the offset curve and return from an end point of the offset curve to a point on the original curve after the end of following the offset curve. An example of the construction of the circuit B' is shown in in FIG. 8. Said initial offset operation is carried out as follows by means of the circuit shown in FIG. 8. First, accumulators 9 and 9' are reset by a signal from the control circuit D while keeping the operation of the second generator B halted. Then gates 10 and 10' are opened by applying a predetermined number of pulses from an addition terminal 12 and $x$ and $y$ are added to the accumulators 9 and 9', respectively, the same number of times as the applied pulses from said registers 4 and 4' shown in FIG. 7. Carry pulses $\Delta x_{in}+$ and $\Delta y_{in}+$ derived from the most significant digits of the accumulators 9, 9' are applied to the synthesizing circuit E. The cutter is moved from the original curve to be set at the initial point on the offset curve by means of the carry pulses. Similarly, when the cutter is returned from the end point of the offset curve to the point on the original curve at the end of following the offset curve, the accumulators 9 and 9' are reset while keeping the operation of the second generator B halted. Then gates 11 and 11' are opened by applying a predetermined number of pulses to a subtraction terminal 12' and $(x, y)$ in said registers 4 and 4' are subtracted from the accumulators 9 and 9', respectively, the same number of times as the applied pulses. Borrow pulses $\Delta x_{in}-$ and $\Delta y_{in}-$ derived from the most significant digits of the accumulators 9, 9' are applied to the synthesizing circuit E. The cutter is returned from the end point of the offset curve to the original curve by means of the borrow pulses.

As described above, it is possible to follow the offset curve freely by means of the each of the pulses obtained. Now, circuits for controlling each generator or circuit are explained. As described before, the second generator B produces a variable signal $(x, y)$. For the $(x, y)$ to be a point on the offset curve, they must satisfy always and simultaneously Equations (4) and (5). Equation (4) is satisfied by setting the initial value $(x_o, y_o)$ correctly $(x_o^2 + y_o^2 = r^2)$ and Equation (5) is satisfied as described next.

That is, whenever $(x, y)$ deviates from the position satisfying Equation (5) with the change of $X(\tau)$ and $Y(\tau)$, it is required to control the second generator B so that $(x, y)$ satisfies Equation (5) by varying $(x, y)$ clockwise or counterclockwise on the circumference expressed by Equation (4). This aspect is illustrated in FIG. 5.

Figure 5A:
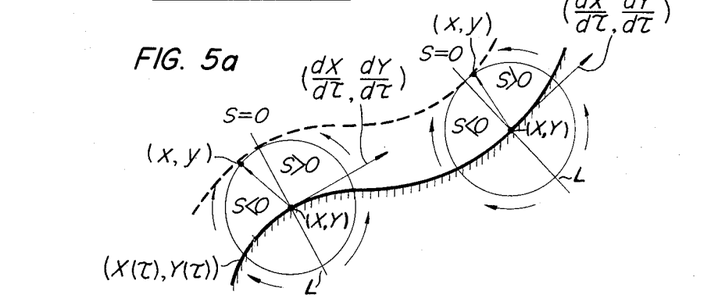
FIGS. 5a, 5b, 6a and 6b are diagrams illustrating the operation of the embodiment of the invention.
Figure 5B:
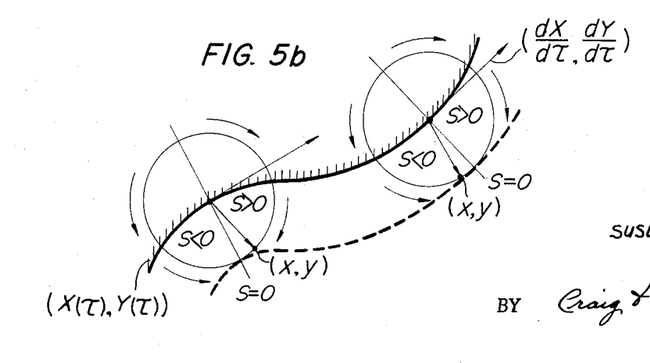
Figure 9:
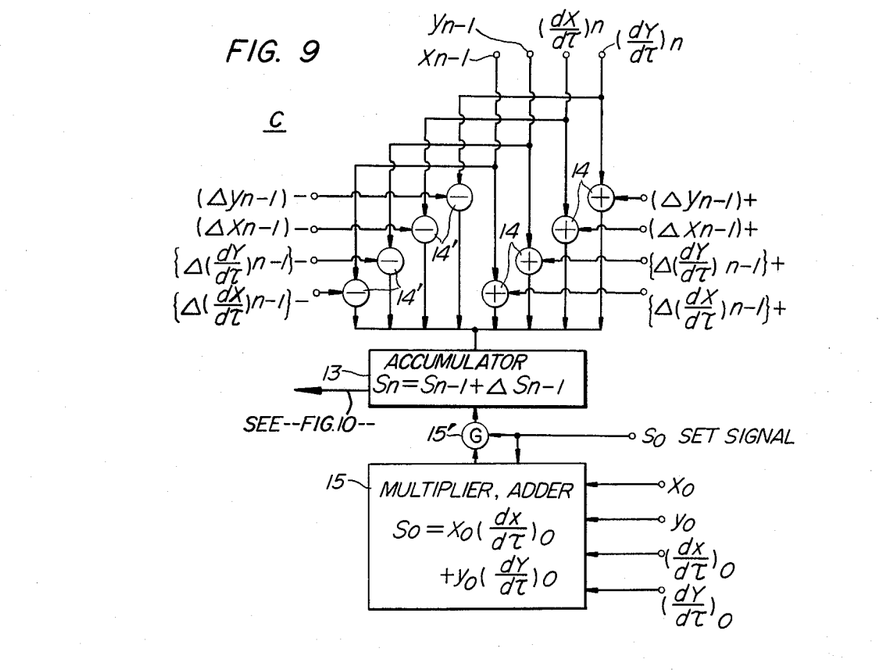
Figure 11:
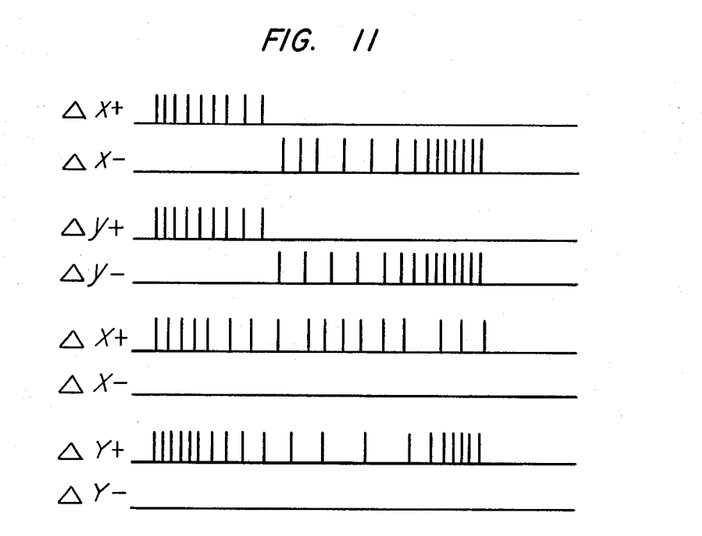
FIGS. 11 and 12 are wave diagrams indicating the timing of different components of the system of the invention.

As shown in FIG. 5a, the relation between $(x, y)$, $(dX/d\tau, dY/d\tau)$ and S is as follows. If $(x, y)$ is on the right side of the line L passing through (X, Y) and perpendicular to the tangential vector $(dX/d\tau, dY/d\tau)$, S>0 and if $(x, y)$ is on the left side of the line L, S<0. If $(x, y)$ is on the line L, S = 0. Consequently, in case $(x, y)$ is offset to the left side of the direction of proceeding along the original curve $\{X(\tau), Y(\tau)\}$, $(x, y)$ must be caused to vary counterclockwise along the circle so that the position vector $(x, y)$ is allowed to coincide with the line L, if S>0 and clockwise if S<0. On the contrary, as shown in FIG. 5b, in case $(x, y)$ is offset to the right side of the direction of proceeding along the original curve, $(x, y)$ must be caused to vary clockwise along the circle if S>0 and counterclockwise if S<0. FIG. 11 shows the original command pulses ($\Delta X+$, $\Delta X-$, $\Delta Y+$, $\Delta Y-$) and offset pulses ($\Delta x+$, $\Delta x-$, $\Delta x+$, $\Delta y-$) at the time of curve following shown in FIG. 5a. However, as is evident from the above description, since it is assumed in this case that the original curve exists in the positive region, the command pulses ($\Delta X-$, $\Delta Y-$) are not produced. As described before $(x, y)$ can be varied clockwise or counterclockwise by applying an instruction signal to the terminal CW or CCW shown in FIG. 7 from the control circuit D. The control circuit D must calculate the inner product S at the present position of $(x, y)$ to produce the instruction signal. The third generator C is used for that purpose, which produces an inner product signal indicating the inner product $S = (x)(dX)/(d\tau) + (y)(dY)/(d\tau)$ (equation (6)) tangential direction $(dX/d\tau, dY/d\tau)$ and the variable $(x, y)$ from said tangential signals and variable signals, an example of the construction of which is shown in FIG. 9. The third generator C first transforms Equation (6) into the following equation $$S_n = S_{n-1} + \left(\frac{dX}{d\tau}\right)_n \Delta x_{n-1} + \left(\frac{dY}{d\tau}\right)_n \Delta y_{n-1}$$
$$+ x_{n-1}\Delta\left(\frac{dX}{d\tau}\right)_{n-1} + y_{n-1}\Delta\left(\frac{dY}{d\tau}\right)_{n-1} \quad (9)$$

and then calculates the inner product S by means of Equation (9). Equation (9) represents the state after the calculating operation for obtaining the inner product in third generator C has been performed $n$ times.

In FIG. 9, a carry pulse $(\Delta x_{n-1})_+$ by the second generator B opens one of ⊕gates 14 corresponding thereto to add a tangential signal $(dX/d\tau)_n$ from the first generator A to the content of an accumulator 13, whereas a borrow pulse $(\Delta x_{n-1})_-$ produced by the second generator B opens one of ⊖gates 14' corresponding thereto to subtract a tangential signal $(dX/d\tau)_n$ from the content of the accumulator 13. By performing similar operations $S_n$ is obtained from Equation (9). Here, pulses $(\Delta x_{n-1})_+, (\Delta y_{n-1})_+, (\Delta x_{n-1})_-, (\Delta y_{n-1})_-, x_{n-1}$ and $y_{n-1}$ are supplied by the second generator B. The signals $(dX/d\tau)_n$ and $(dY/d\tau)_n$ are supplied by the first generator A. The signals $$\left\{\Delta\left(\frac{dX}{d\tau}\right)_{n-1}\right\}+, \left\{\Delta\left(\frac{dY}{d\tau}\right)_{n-1}\right\}+, \left\{\Delta\left(\frac{dX}{d\tau}\right)_{n-1}\right\}-$$

and $$\left\{\Delta\left(\frac{dY}{d\tau}\right)_{n-1}\right\}-$$

are supplied by the input device F through the control circuit D.

The carry or borrow pulse produced from the most significant digit of the accumulator 13 corresponds to $S_n$ calculated to that time, and is sent to the control circuit D. Here, it is required that an initial value $S_o$ of $S_n$ has been preset in the accumulator 13 to calculate $S_n$ as is evident from Equation (9). The initial value $S_o$ of S is determined by means of $S_o = (x_o)(dX/d\tau)_o + (y_o)(dY/d\tau)_o$ from the initial value $(x_o, y_o)$ of $(x, y)$ and the initial value $$\left\{\left(\frac{dX}{d\tau}\right)_o, \left(\frac{dY}{d\tau}\right)_o\right\} \text{ of } \left(\frac{dX}{d\tau}, \frac{dY}{d\tau}\right).$$

For that purpose, and $S_o$ set signal is applied to a circuit 15 consisting of a multiplier and adder and a gate 15'. Then since said each initial value is applied from the input device F and the offset setting device G to the circuit 15, $S_o$ is calculated immediately and applied to the accumulator 13 through the gate 15'.

Figure 8:
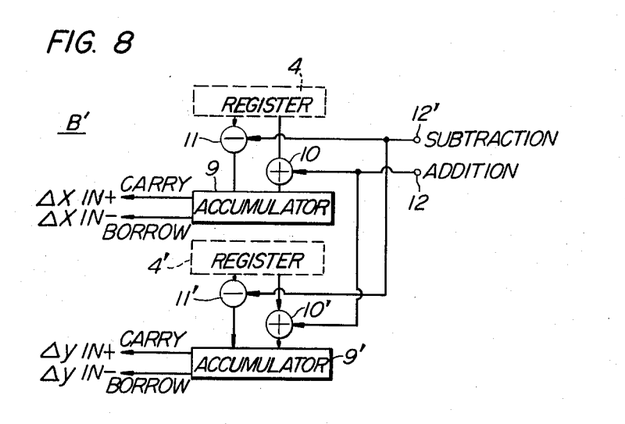

$S_o$ is also obtainable by utilizing the fact that $x_o$ and $y_o$ are stored in the registers 4 and 4' of the second generator B. That is, in FIG. 8a predetermined number of pulses is applied to the addition terminal 12 so as to add $(x_o, y_o)$ from said registers to the accumulators 9, 9' and output pulses from the accumulators 9, 9' are applied to the associated gates of FIG. 9 without being applied to the synthesizing circuit E of FIG. 4. Thus, $S_o$ can be set in the accumulator 13 in FIG. 9.

The inner product S can be calculated as described above, but when $(dX/d\tau, dY/d\tau)$ varies discontinuously, an inner product $S_d$ in such case is obtained as follows. That is, $S_d$ is calculated in a manner similar to that of obtaining the initial value $S_o$, by utilizing said circuit 15, after interrupting the operation of the first and second generators A and B, from $(x, y)$ at the time of interruption and $(dX/d\tau, dY/d\tau)$ after the discontinuous variation.

Then, the control circuit D controls each circuit, generator, and especially the second generator based on the inner product S thus obtained. Before describing the construction of the control circuit D, the manner of control by the control circuit D will be described.

By means of the instruction signal from the control circuit D, the variables $(x, y)$ are caused to vary clockwise or counterclockwise along the circle so as to approach the point on the offset curve where $S = 0$ and when the velocity of the variation of $(dX/d\tau, dY/d\tau)$ is sufficiently small compared with that of $(x, y)$, the state of $S = 0$ is practically maintained.

However, if the variation velocity of $(dX/d\tau, dY/d\tau)$ (with respect to $\tau$) is large, said state can not be maintained and so, in this case, the control action of the control circuit D is determined as follows.

Figure 6A:
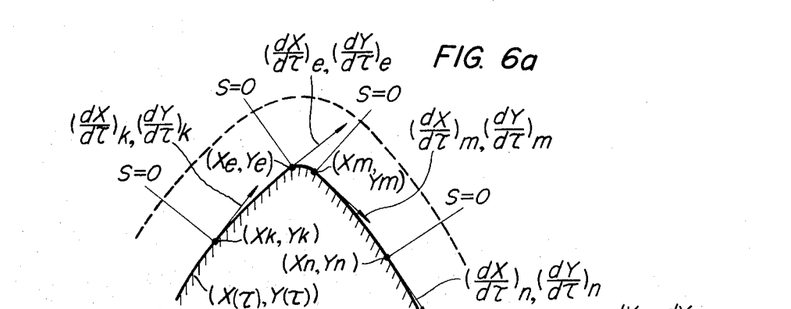
Figure 6B:
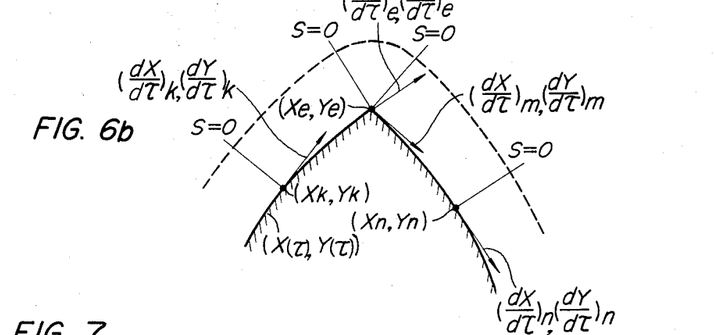

The first generator A is caused to operate by the control circuit D only when S is near zero, whereas at any other time, said generator A is interrupted. According to this control action, even if the radius of curvature of the original curve $\{X(\tau), Y(\tau)\}$ is small and the variation velocity of $(dX/d\tau, dY/d\tau)$ is large as shown in FIG. 6a, the variables $(x, y)$ can practically be varied so as to satisfy $S = 0$. Further, also in the limiting case where the radius of curvature of the offset curve is zero as shown in FIG. 6b, that is $(dX/d\tau, dY/d\tau)$ varies discontinuously from $$\left\{\left(\frac{dX}{d\tau}\right)_1, \left(\frac{dY}{d\tau}\right)_1\right\} \text{ to } \left\{\left(\frac{dX}{d\tau}\right)_m, \left(\frac{dY}{d\tau}\right)_m\right\}$$

, generator A must be interrupted (X, Y) till $(x, y)$ varies so that the inner product of $(x, y)$ and $$\left\{\left(\frac{dX}{d\tau}\right)_m, \left(\frac{dY}{d\tau}\right)_m\right\}$$

become practically zero, whereby the offset curve between $$\left\{\left(\frac{dX}{d\tau}\right)_1, \left(\frac{dY}{d\tau}\right)_1\right\}$$

and $$\left\{\left(\frac{dX}{d\tau}\right)_m, \left(\frac{dY}{d\tau}\right)_m\right\}$$

become the minute radius arc at the discontinuous point on the offset curve. Therefore, $(x, y)$ is made to vary as if there exists the minute radius arc at the discontinuous point on the original curve.

The control circuit D for realizing the above-mentioned control controls the operation of the generator A and B as follows: The second generator B is always caused to operate during following the offset curve and the control circuit D monitors the sign of S before and after the minute variation of $(x, y)$ resulting from the operation of the generator B. Then, if the change of the sign occurs, the first generator A is caused to operate or if the change does not occur, the operation of the generator A is interrupted. Since S varies oscillatingly around zero when (x, y) has reached the point satisfying $S = 0$ by performing in the above manner, the judgement for causing the first generator A to operate is easily realized only when $S = 0$ is practically satisfied.

Figure 10:
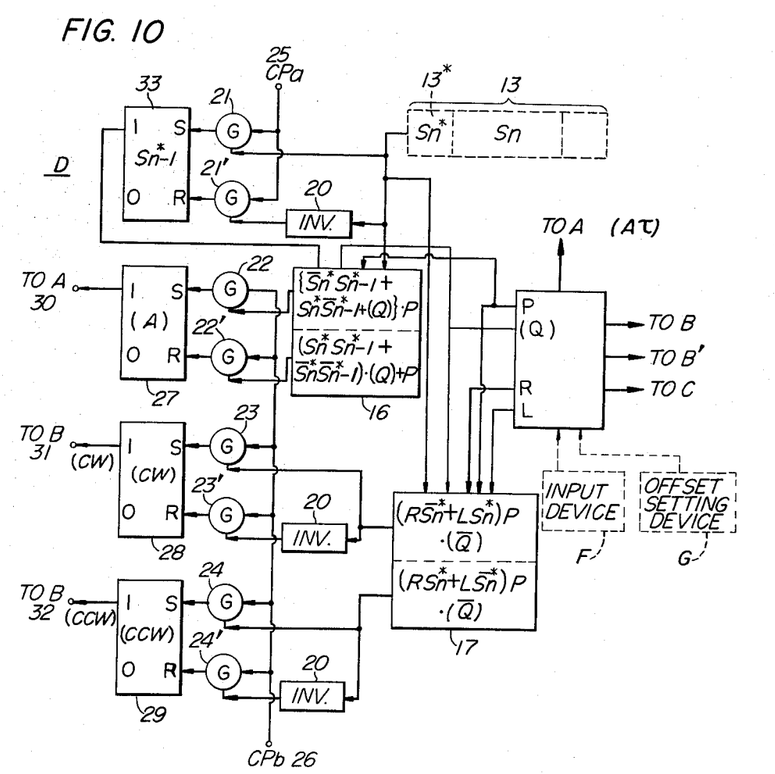

FIG. 10 is an embodiment of the control circuit D. In FIG. 10, numeral 13* designates a part storing a sign bit in the register 13 of FIG. 9, the content thereof being stored in a flip-flop circuit 33 by applying a timing pulse $CP_a$ shown in FIG. 12 to gates 21 and 21' prior to the operation of the third generator C. Accordingly, at the time when the n-th repeated operation is finished, the sign bit $S_n^*$ of the value $S_n$ of S is stored in the part 13*, and the sign bit $S_{n-1}^*$ of $S_{n-1}$ is stored in the flip-flop circuit 33. Reference numeral 17 designates a first logical circuit for instructing the variation direction (clockwise or counterclockwise) of $(x, y)$ and 20 designates an inverter. The first logical circuit 17 produces logical output signals $(R\overline{S_n^*} + LS_n^*) \cdot P \cdot (\overline{Q})$ and $(RS_n^* + L\overline{S_n^*}) \cdot P \cdot (\overline{Q})$ from a signal P for instructing the following operation, signals L and R representing the left-hand side offset and the right-hand side offset and a signal $S_n^*$ from the part 13*, which are applied to respective gates 23 and 24. In case $S_n$ is negative with left-hand side offset or $S_n$ is positive with right-hand side offset, the gate 23 is opened and a flip-flop circuit 28 is set to "1" by a timing pulse $CP_b$, shown in FIG. 12, and in the other case, a gate 23' is opened and the circuit 28 is reset to "0." Similarly, in case $S_n$ is positive with left-hand side offset or $S_n$ is negative with right-hand side offset, the gate 24 is opened and a flip-flop circuit 29 is set to "1" by means of the timing pulse $CP_b$, and in the other case, a gate 24' is opened and the circuit 29 is reset to "0." When the flip-flop circuit 28 is set to "1," the instruction signal for making $(x, y)$ vary clockwise appears at an output terminal 31. Similarly when the flip-flop circuit 29 is set to "1," the instruction signal for making $(x, y)$ vary counterclockwise appears at an output terminal 32. Reference numeral 16 designates a second logical circuit for detecting the variation of the sign of S. The second logical circuit 16 produces logical output signals $\{\overline{S_n} \cdot S_{n-1}^* + S_n \cdot \overline{S_{n-1}^*} + (Q)\} \cdot P$ and $\{S_n \cdot S_{n-1}^* + \overline{S_n} \cdot \overline{S_{n-1}^*}\} \cdot (Q) + \overline{P}$ which are applied to gates 22 and 22'. When the signal P is given, if the sign of S changes, that is, if $S_n^*$ and $S_{n-1}^*$ are different, the gate 22 is opened and a flip-flop circuit 27 is set to "1" by means of the timing pulse $CP_b$, and if $S_n^*$ and $S_{n-1}^*$ are the same, the gate 22' is opened and the circuit 27 is reset. When the flip-flop circuit 27 is set to "1," the instruction signal for making the first generator A operate appears at an output terminal 30. Here, if the value of S remains near zero during following the offset curve (for example, when the curve to be followed is a linear line), it is unnecessary to vary $(x, y)$ counterclockwise or clockwise. Therefore, in this case, a signal Q and its negation signal $\overline{Q}$ are applied to the first and second logical circuits 16 and 17, respectively, to make the instruction signal for the first generator A appear at the output terminal 30 without making the instruction signal therefor appear at the output terminals 31 and 32 during the time when the above offset curve is followed.

Figure 12:
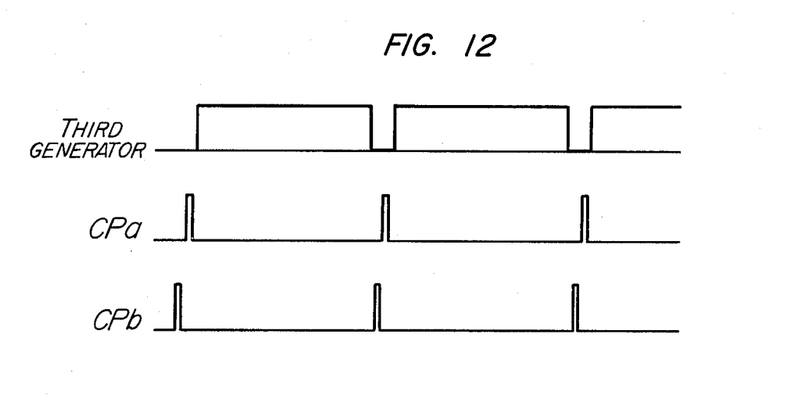

In a manner as stated above, after the timing pulses $CP_a$ and $CP_b$ as shown in FIG. 12 are applied to the terminals 25 and 26, the third generator C operates and the result of calculation of the inner product is stored in the register 13, and similar operations are repeated.

The input device F comprised of for example, a known tape reader reads out informations necessary for each generator and circuit from an instruction tape and sends them to the control circuit D. There are recorded on said instruction tape informations about the original curve such as $\{\Delta(dX/d\tau), \Delta(dY/d\tau)\}$, $$\left\{\left(\frac{dX}{d\tau}\right)_0, \left(\frac{dY}{d\tau}\right)_0\right\}$$

, X, Y, the signals P and Q, etc.

G is an offset setting device for setting a desired offset distance r, from which an information $(x_0, y_0)$ about the offset distance r and informations L, R indicating the direction of the offset are sent to the control circuit D and second generator B. The offset distance and its offset direction can be set freely by means of the offset setting device G, and it is possible to change freely the offset distance, for example, the radius of a cutter without changing the information recorded on the instruction tape.

What is claimed is:

1. A numerically controlled contouring system comprising:
   first means for producing original command pulses ($\Delta X$, $\Delta Y$) to follow an original curve $X(\tau)$, $Y(\tau)$ and tangential signals indicating the tangential direction $(dX/d\tau, dY/d\tau)$ of the original curve;
   second means for producing variable signals representing variables $(x,y)$, respectively, which vary along the circumference of a circle having a radius equal to a desired offset distance and a center lying on the original curve and offset pulses ($\Delta x$, $\Delta y$) to follow the variables;
   offset setting means for producing initial signals representing initial values $(x_0, y_0)$ of the variables in accordance with the desired offset distance and for supplying the initial signals to the second means so as to determine said radius with said initial values;

gate means for controlling the direction of variation of the variable signals;

third means for producing an inner product signal representing the inner product $S = (x)(dX/dr + dY/dr)$ between the tangential signals and the variable signals supplied from said first and second means;

control means for producing instruction signals (CW,CCW) representing the direction of variation of the variable signals in accordance with the inner product signal supplied form said third means and for supplying the instruction signal to the gate means so that the variable signals are controlled to vary in the direction indicated by the instruction signals so as to make the inner product zero; and fourth means for synthesizing said original command pulses and offset pulses so as to obtain offset command pulses $(\Delta X + \Delta x, \Delta Y + \Delta y)$ to follow an offset curve spaced apart by the offset distance from the original curve.

* * * * *